United States Patent
Zhong et al.

(10) Patent No.: US 7,065,267 B2
(45) Date of Patent: Jun. 20, 2006

(54) ATHERMAL FUSED COUPLER PACKAGE FOR OPTICAL FIBERS

(75) Inventors: Johnny Zhong, Union City, CA (US); Steve Wang, San Jose, CA (US); Senlu Xu, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/712,066

(22) Filed: Nov. 13, 2003

(65) Prior Publication Data

US 2005/0152647 A1 Jul. 14, 2005

Related U.S. Application Data

(60) Provisional application No. 60/426,563, filed on Nov. 14, 2002.

(51) Int. Cl.
*G02B 6/261* (2006.01)

(52) U.S. Cl. .............................. 385/15; 385/78; 385/80; 385/85; 385/92

(58) Field of Classification Search ................... 385/15, 385/50, 58, 78, 80, 85, 92
See application file for complete search history.

(56) References Cited

U.S. PATENT DOCUMENTS

| | | | | |
|---|---|---|---|---|
| 4,632,513 A | * | 12/1986 | Stowe et al. ................... | 216/24 |
| 5,430,821 A | * | 7/1995 | Sasoka et al. ................. | 385/99 |
| 5,894,651 A | * | 4/1999 | Dvorsky et al. ............. | 310/344 |
| 6,085,001 A | * | 7/2000 | Belt ............................. | 385/51 |
| 6,134,362 A | | 10/2000 | Au-Yeung et al. | |
| 6,278,821 B1 | * | 8/2001 | Carberry et al. ............... | 385/39 |
| 6,324,322 B1 | * | 11/2001 | Luo et al. ...................... | 385/43 |
| 6,326,685 B1 | * | 12/2001 | Jin et al. ...................... | 257/706 |
| 6,404,954 B1 | | 6/2002 | Zhu et al. | |
| 6,408,119 B1 | | 6/2002 | Meltz et al. | |
| 6,431,767 B1 | | 8/2002 | Nagasaki | |
| 6,434,287 B1 | * | 8/2002 | Leyva et al. .................. | 385/16 |

\* cited by examiner

*Primary Examiner*—Kaveh Kianni
(74) *Attorney, Agent, or Firm*—Workman Nydegger

(57) ABSTRACT

The present invention is directed to a fused coupler having at least two fiber optic cables that have a positive coefficient of thermal expansion. A section of each of the fiber optic cables is placed together and heated until they form a single fused section that acts as a coupler. A jacket having a negative coefficient of thermal expansion, the absolute value of which is approximately equal to the absolute value of the positive coefficient of thermal expansion of the fiber optic cables, is placed around the fused section of the fiber optic cables. The jacket can be manufactured from a ceramic material that is specifically manufactured with a negative coefficient of thermal expansion. A filler material, such as an epoxy resin, is inserted in a gap between the jacket and the fused sections of the fiber optic cables such that the gap is filled in.

25 Claims, 2 Drawing Sheets

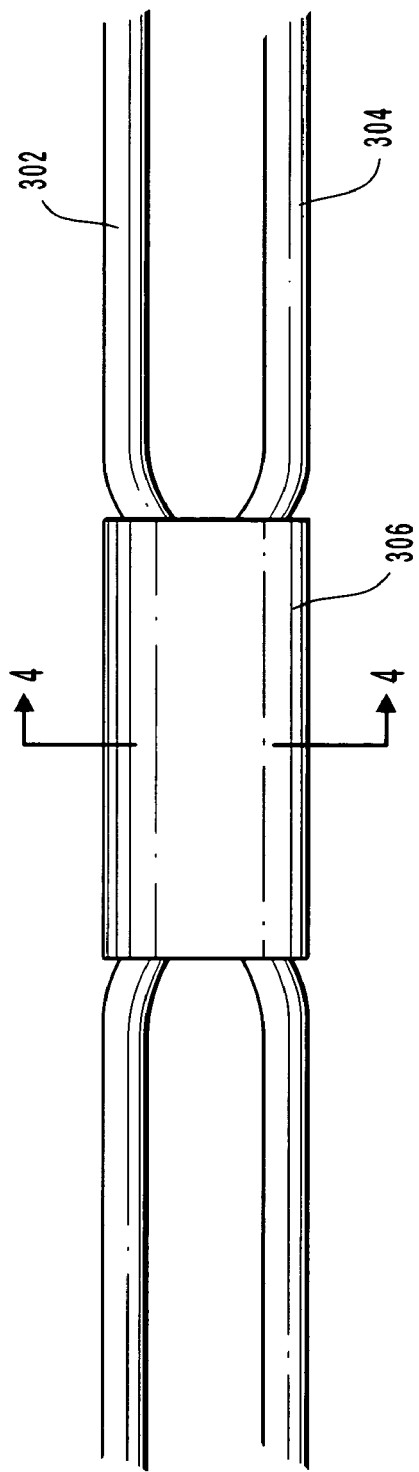
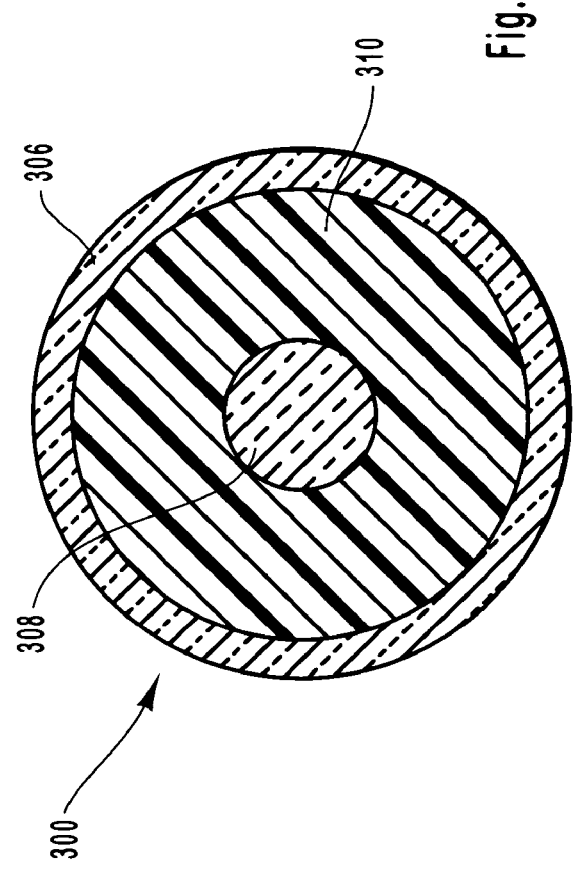

ATHERMAL FUSED COUPLER PACKAGE FOR OPTICAL FIBERS

CROSS-REFERENCE TO RELATED APPLICATIONS

The present invention claims priority to and the benefit of U.S. Provisional Patent Application Ser. No. 60/426,563, dated Nov. 14, 2002 and entitled "Athermal Fused Coupler Package for Optical Fibers", which is incorporated herein by reference in its entirety.

BACKGROUND OF THE INVENTION

1. The Field of the Invention

The present invention relates to optical couplers and more specifically to thermally fused couplers for joining segments of fiber optic cable.

2. The Relevant Technology

Fiber optic cable is being used more and more to connect computers to each other and to the Internet. From localized Gigabit Ethernet networks, to wide area networks (WANs) spanning the entire planet, fiber optic cable has become the fastest, easiest way to transmit large amounts of data over either long or short distances. Some fiber optic applications require couplers to route the incoming fiber optic signals to their various destinations.

Fiber optic couplers allow for crossover between the signals on one fiber optic cable and another fiber optic cable. This crossover can also be tuned to allow for certain wavelengths to either cross over or be blocked. However, whether a particular network uses a coupler with a single fiber optic strand or a coupler with many strands, the temperature of the fiber optic cable affects the wavelength propagation properties of the transmitted signal.

An example of a fiber that can be used in a fiber optic coupler is shown in FIG. 1. Two fiber optic lines 10 and 12 are placed side by side. Line 10 has a central section 14 and line 12 has a central section 16. The cladding of central sections 14, 16 is removed and the cores of optical lines 10, 12 can be joined and heated to produce a fused section 18 which acts a fiber optic coupler. Once a cladding layer is applied to fused section 18, a fiber optic coupler 20 is created, as shown in FIG. 2.

In standard couplers, the fused section can then be enclosed in a jacket or ferrule to protect the fused section from untoward bending, which would adversely affect the optical signals traveling through coupler 20. Fiber optic couplers of this type are well known in the art. For a specific method of producing such a fiber optic coupler, see, for example, U.S. Pat. No. 6,431,767.

There are a large number of fiber optic couplers, such as the one illustrated above, available on the market, having various transmission properties that may be desirable for one reason or another. However, all of the couplers currently available suffer, to some extent, from the problem of wavelength shift when the coupler becomes heated.

Most materials have a positive coefficient of thermal expansion, meaning that they expand when they are heated and contract when they cool. Standard fiber optic lines are made from silicon, which has a positive coefficient of thermal expansion. In order to minimize the wavelength shift due to the thermal expansion of the fiber optic cable, conventional systems typically have used a jacket or ferrule over the coupled portion of the fiber optic cable that has approximately the same coefficient of thermal expansion as the fiber optic cable itself. Using a ferrule having approximately the same coefficient of thermal expansion does help alleviate the problem, but it is an imperfect solution. The fiber optic cable still changes shape based on the current temperature. This change in shape still adversely affects the transmission properties of the cable.

BRIEF SUMMARY OF THE INVENTION

There is thus a need in the art for an invention that minimizes or alleviates the wavelength shift that occurs due to the change in temperature of the sleeve/coupler combination. The present invention is directed to a fused fiber optic coupler that uses a ferrule having a negative coefficient of thermal expansion over the coupled section, and a method for making the same.

In an exemplary embodiment, a ceramic material that has a negative coefficient of thermal expansion, whose absolute value is approximately equal to the absolute value of the coefficient of thermal expansion of the fiber optic cable, is used for the jacket of the coupler. Such a configuration results in an athermal device that changes shape very little as temperature changes. The fiber optic coupler is athermal in that the operating characteristics of the optical fibers enclosed within the fiber optic coupler are essentially constant without regard to changes in the ambient temperature.

One exemplary embodiment of the present invention is a fused coupler comprising at least two fiber optic cables having a positive coefficient of thermal expansion. A section of each of the fiber optic cables is placed together and heated until they form a single fused section. A jacket having a negative coefficient of thermal expansion, the absolute value of which is approximately equal to the absolute value of the positive coefficient of thermal expansion of the fiber optic cables, is placed around the fused section of the fiber optic cables. The jacket can be manufactured from a ceramic material that is specifically manufactured with a negative coefficient of thermal expansion. A filler material, such as an epoxy resin, is inserted in a gap between the jacket and the fused sections of the fiber optic cables such that the gap is filled in.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3 is a side view of one exemplary embodiment of the present invention; and

FIG. 4 is a cross-sectional end view of the exemplary embodiment shown in FIG. 3 taken along line 4—4.

DETAILED DESCRIPTION OF THE EXEMPLARY EMBODIMENTS

Figure 1:
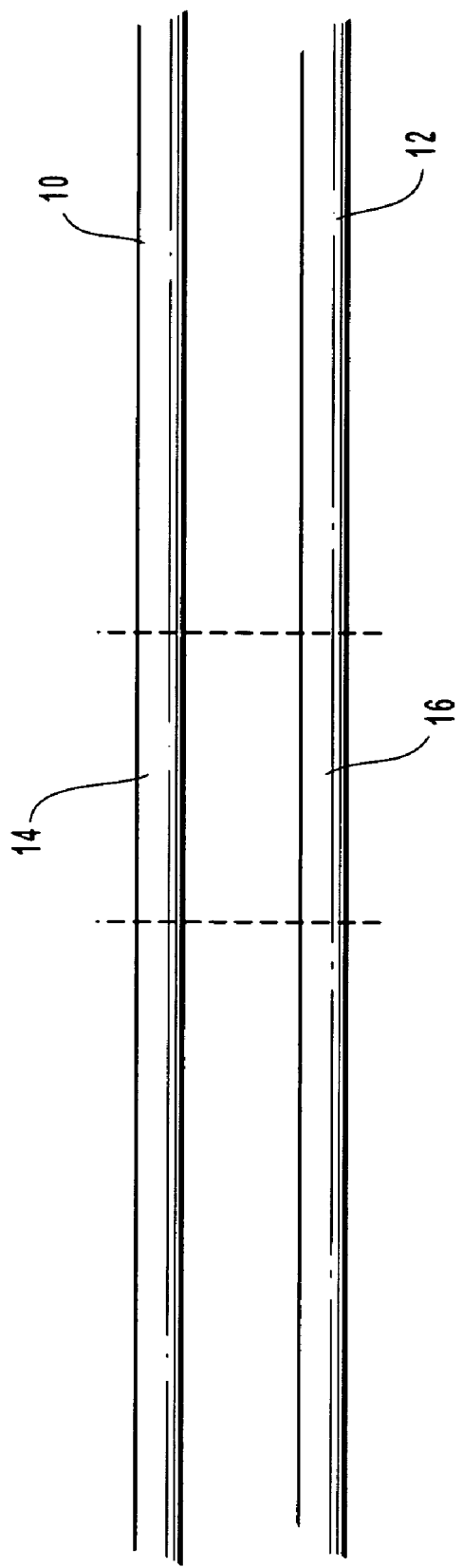
FIG. 1 is a prior art side view configuration of two fiber optic cables.
Figure 2:
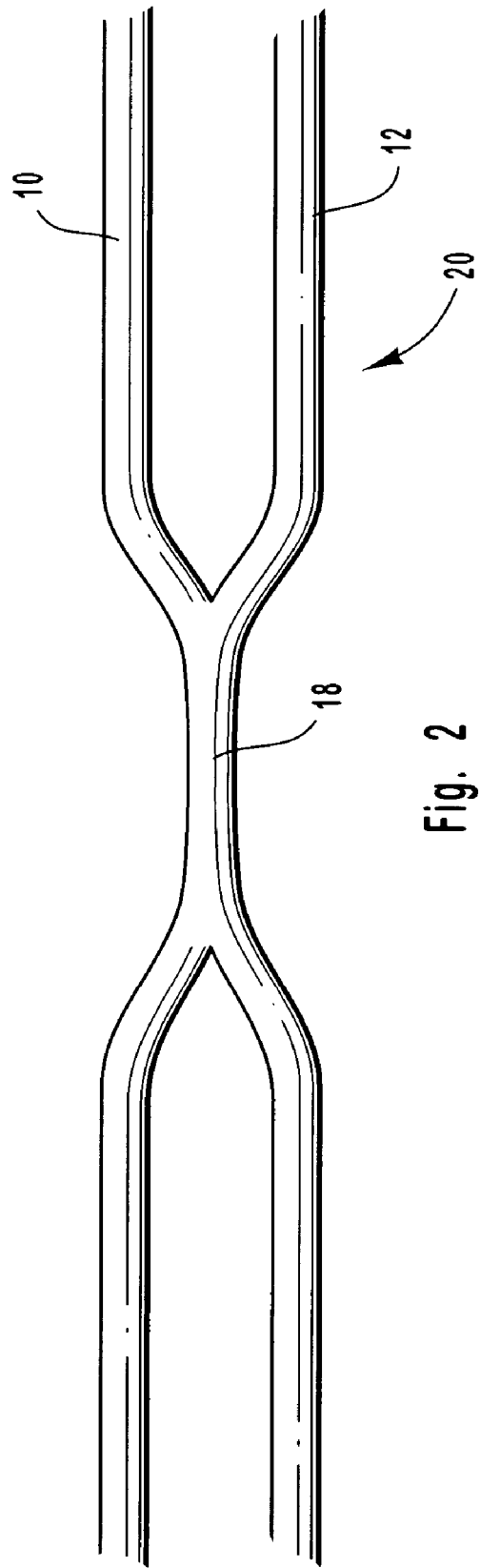
FIG. 2 is a prior art side view of the two fiber optic cables of FIG. 1 with a section of each cable fused together.

One exemplary embodiment of a fiber optic coupler in accordance with the present invention is shown in FIG. 3, as indicated generally by reference numeral 300. Coupler 300 includes a first fiber optic line 302 and a second fiber optic line 304. Fiber optic lines 302, 304 have a positive coefficient of thermal expansion, meaning that, as they are heated, they expand. Such fiber optic lines can be standard silicon fiber optic cables currently available in the marketplace. Alternately, fiber optic lines 302, 304 can be any fiber optic line capable of transmitting optical signals and further capable of having a section thereof fused into a coupler.

As detailed above, fiber optic lines 302, 304 have a fused section 308 (shown in FIG. 4) that functions as a fiber optic coupler. Fused section 308 is enclosed in jacket 306. A fill material 310 fills any space between jacket 306 and fused section 308, while also holding fused section 308 in fixed position with respect to jacket 306. In one exemplary embodiment of the present invention, fill material 310 is an epoxy resin. The epoxy resin can have a coefficient of thermal expansion that is approximately zero. Alternately, the epoxy resin can have a coefficient of thermal expansion that is approximately equal to either jacket 306 or fused section 308. Alternately, fill material 310 can be glass solders and other adhesive materials that fix the position of the pulled fiber coupler and maintain this position when the temperature changes.

In one exemplary embodiment of the present invention, jacket 306 is a ferrule made from a material having a negative coefficient of thermal expansion, meaning that, as it is heated, it contracts. Ideally, the absolute value of the coefficient of thermal expansion of jacket 306 is equal to the absolute value of the coefficient of thermal expansion of fused section 308. When the temperature of fused section 308 increases, this applies stress to the expanded fiber coupler portion. The stress induced optical index change will compensate for the optical length increase at the fiber coupled portion and therefore the optical performance of the fiber coupler is not sensitive to the environmental temperature.

Under these conditions, when jacket 306 is fixed about fused section 308 with fill material 310, changes in temperature result in near zero expansion/contraction of the resulting coupler. This is a highly desirable result, as it ensures that the wavelength propagation properties of the coupler remain constant at any temperature within the operating range of the fiber optic cables. It will be understood by those of skill in the art that the absolute values for the coefficients of thermal expansion for jacket 306 and fused section 308 can be approximately or generally the same, while still performing the desired function of achieving near zero expansion/contraction. Therefore, coefficients of thermal expansion that have about the same absolute values are contemplated by the present invention.

Jacket 306 can be fabricated from a commercially available ceramic material that has a negative coefficient of thermal expansion, such as, but not limited to, Zirconium Tungstate ($ZrW_2O_8$), β-eucryptite ($Li_2O.Al_2O_3.SiO_2$), Lithium silicate porcelains, materials under the trademark ZERODUR, or other materials having a negative coefficient of thermal expansion. It is possible to adjust the coefficient of thermal expansion of jacket 306 to ensure that the absolute value of the coefficient of jacket 306 is approximately equal to the absolute value of the coefficient for fused section 308.

The invention also extends to a method of fabricating an athermal fused coupler. There are several steps involved, beginning with providing at least two fiber optic cables having a positive coefficient of thermal expansion. A section of the core of each fiber optic cable is placed together and heated until they form a single fused section capable of operating as a coupler. The fused section of the fiber optic cable is inserted into a jacket having a negative coefficient of thermal expansion, the absolute value of which is approximately equal to the absolute value of the positive coefficient of thermal expansion. The gap between the ferrule and the fused section is then filled with a filler material, such as an epoxy resin. The coupler can be tuned to provide coupling of wavelengths in the 1310 nm to 1550 nm range. Additionally, the coupler can be tuned to use the entire range of the C and L bands. The use of other bands is also possible. The tuning of the coupler is realized by fusing the two fibers together with, by way of example and not limitation, a hydrogen flame. As the fibers are pulled and fused, the performance of the coupler is in situ tested and monitored by an optical spectrum analyzer.

The invention as described has a wide range of applications, including use in coarse wavelength division multiplexing (CWDM) and dense wavelength division multiplexing (DWDM) applications for metropolitan area networks (MANs). Exemplary embodiments of the present invention can be used whenever the coupler center wavelength needs to be controlled very accurately over a desired temperature range. This can be desirable to avoid the use of the thermal electrical cooler used by the multiplexers in these applications, thus providing a power savings. Exemplary embodiments of the present invention can also be used in a pump combiner application case, where a WDM coupler is used to combine the 980 nm optical power generated by a laser to the 1550 mm Erbium doped fiber amplifier. However, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

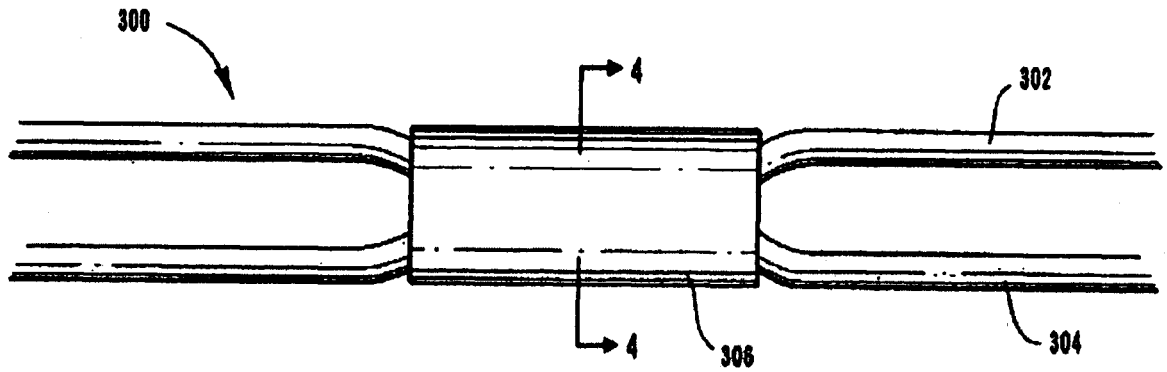

What is claimed is:

1. An athermal optical coupler comprising:
   at least two optical waveguides, at least a portion of each of said optical waveguides being fused together to form a fused section, said fused section having a positive coefficient of thermal expansion;
   a jacket surrounding said fused section, said jacket being formed from a material having a negative coefficient of thermal; and
   wherein said material comprises a ceramic.

2. The athermal optical coupler of claim 1, wherein an absolute value of said negative coefficient of thermal expansion is approximately equal to an absolute value of said positive coefficient of thermal expansion.

3. The athermal optical coupler of claim 1, wherein said waveguides comprise fiber optic cables and wherein said fused section is fixed within said jacket using a resin.

4. The athermal optical coupler of claim 3 wherein each of said fiber optic cables is a single mode fiber optic cable.

5. The athermal optical coupler of claim 3, wherein said resin is an epoxy resin.

6. The athermal optical coupler of claim 5, wherein said epoxy resin has a coefficient of thermal expansion approximately equal to said negative coefficient.

7. The athermal optical coupler of claim 5, wherein said epoxy resin has a coefficient of thermal expansion approximately equal to zero.

8. The athermal optical coupler of claim 5, wherein said epoxy resin has a coefficient of thermal expansion approximately equal to said positive coefficient.

9. The athermal optical coupler of claim 1 wherein said fused section allows light signals traveling on a first optical waveguide to be propagated onto a second optical waveguide and vice versa.

10. A fused fiber optic coupler, comprising:
   at least two fiber optic cables each having a positive coefficient of thermal expansion, wherein a section of each of said fiber optic cables is fused together to form a fused section capable of operating as a coupler;
   a ferrule having a negative coefficient of thermal expansion wherein said ferrule being mounted to and disposed from said fused section of said fiber optic cables by a filler material fills disposed in a gap between said ferrule and said fused section; and
   wherein an absolute value of said negative coefficient is approximately equal to an absolute value of said positive coefficient.

11. The fused fiber optic coupler of claim 10, wherein said ferrule comprises a ceramic.

12. The fused fiber optic coupler of claim 10, wherein said coupler is fixed within said ferrule using a resin.

13. The fused fiber optic coupler of claim 12, wherein said resin is an epoxy resin.

14. The fused fiber optic coupler of claim 13, wherein said epoxy resin has a coefficient of thermal expansion approximately equal to said negative coefficient.

15. The fused fiber optic coupler of claim 13, wherein said epoxy resin has a coefficient of thermal expansion approximately equal to zero.

16. The fused fiber optic coupler of claim 13, wherein said epoxy resin has a coefficient of thermal expansion approximately equal to said positive coefficient.

17. A method for manufacturing an athermal fiber optic coupler, said method comprising:
   a step for fusing together at least a portion of at least two fiber optic cables to form an optical coupler, said optical coupler having a positive coefficient of thermal expansion;
   a step for mounting a jacket to said optical coupler, said jacket being formed from a material having a negative coefficient of thermal expansion;
   a step for injecting a filler material into a gap between said ferrule and said fused section; and
   wherein said material comprises a ceramic.

18. The method of claim 17,
   wherein an absolute value of said negative coefficient of thermal expansion is approximately equal to an absolute value of said positive coefficient of thermal expansion.

19. The method of claim 17, wherein said coupler is fixed within said jacket using a resin.

20. The method of claim 19, wherein said resin is an epoxy resin.

21. The method of claim 20, wherein said epoxy resin has a coefficient of thermal expansion approximately equal to said negative coefficient.

22. The method of claim 20, wherein said epoxy resin has a coefficient of thermal expansion approximately equal to zero.

23. The method of claim 20, wherein said epoxy resin has a coefficient of thermal expansion approximately equal to said positive coefficient.

24. The method of claim 17, wherein the step of fusing together said portions of said at least two fiber optic cables includes a step for stripping a cladding component away from said portions to expose said portions.

25. The method of claim 24 wherein each of said fiber optic cables is a single mode fiber optic cable.

* * * * *

UNITED STATES PATENT AND TRADEMARK OFFICE
CERTIFICATE OF CORRECTION

PATENT NO. : 7,065,267 B2  Page 1 of 2
APPLICATION NO. : 10/712066
DATED : June 20, 2006
INVENTOR(S) : Zhong et al.

It is certified that error appears in the above-identified patent and that said Letters Patent is hereby corrected as shown below:

The Title page, showing an illustrative figure, should be deleted and substitute therefor the attached title page.

Drawings
Sheet 2, replace Fig. 3 with the figure depicted herein below, wherein the reference --300-- has been added.

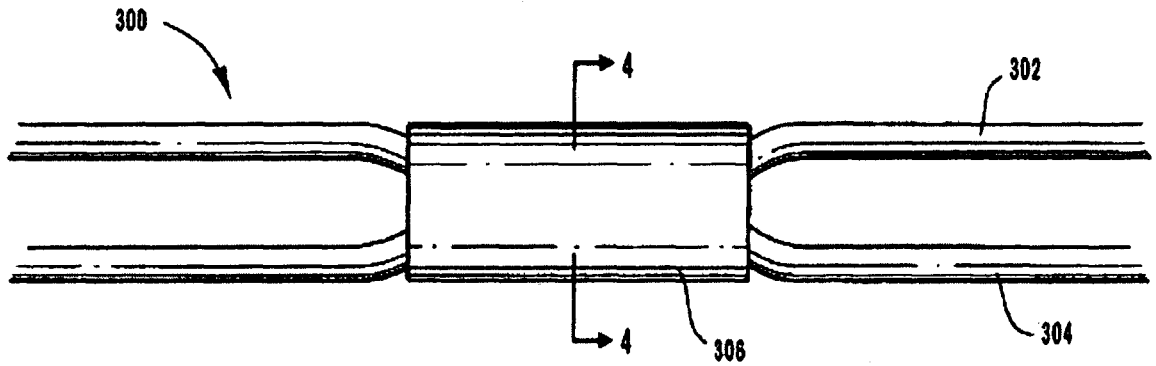

Fig. 3

Column 6
Line 35, after "24", insert --,--.

Signed and Sealed this

Third Day of August, 2010

David J. Kappos
*Director of the United States Patent and Trademark Office*

United States Patent
Zhong et al.

(10) Patent No.: US 7,065,267 B2
(45) Date of Patent: Jun. 20, 2006

(54) ATHERMAL FUSED COUPLER PACKAGE FOR OPTICAL FIBERS

(75) Inventors: Johnny Zhong, Union City, CA (US); Steve Wang, San Jose, CA (US); Senlu Xu, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/712,066

(22) Filed: Nov. 13, 2003

(65) Prior Publication Data
US 2005/0152647 A1    Jul. 14, 2005

Related U.S. Application Data

(60) Provisional application No. 60/426,563, filed on Nov. 14, 2002.

(51) Int. Cl.
*G02B 6/261* (2006.01)
(52) U.S. Cl. .................... 385/15; 385/78; 385/80; 385/85; 385/92
(58) Field of Classification Search ............... 385/15, 385/50, 58, 78, 80, 85, 92
See application file for complete search history.

(56) References Cited

U.S. PATENT DOCUMENTS

| | | | | |
|---|---|---|---|---|
| 4,632,513 A | * | 12/1986 | Stowe et al. | 216/24 |
| 5,430,821 A | * | 7/1995 | Sasoka et al. | 385/99 |
| 5,894,651 A | * | 4/1999 | Dvorsky et al. | 310/344 |
| 6,085,001 A | * | 7/2000 | Belt | 385/51 |
| 6,134,362 A | | 10/2000 | Au-Yeung et al. | |
| 6,278,821 B1 | * | 8/2001 | Carberry et al. | 385/39 |
| 6,324,322 B1 | * | 11/2001 | Luo et al. | 385/43 |
| 6,326,685 B1 | * | 12/2001 | Jin et al. | 257/706 |
| 6,404,954 B1 | | 6/2002 | Zhu et al. | |
| 6,408,119 B1 | | 6/2002 | Meltz et al. | |
| 6,431,767 B1 | | 8/2002 | Nagasaki | |
| 6,434,287 B1 | * | 8/2002 | Leyva et al. | 385/16 |

* cited by examiner

*Primary Examiner*—Kaveh Kianni
(74) *Attorney, Agent, or Firm*—Workman Nydegger

(57) ABSTRACT

The present invention is directed to a fused coupler having at least two fiber optic cables that have a positive coefficient of thermal expansion. A section of each of the fiber optic cables is placed together and heated until they form a single fused section that acts as a coupler. A jacket having a negative coefficient of thermal expansion, the absolute value of which is approximately equal to the absolute value of the positive coefficient of thermal expansion of the fiber optic cables, is placed around the fused section of the fiber optic cables. The jacket can be manufactured from a ceramic material that is specifically manufactured with a negative coefficient of thermal expansion. A filler material, such as an epoxy resin, is inserted in a gap between the jacket and the fused sections of the fiber optic cables such that the gap is filled in.

25 Claims, 2 Drawing Sheets